(12) United States Patent
Le Coarer et al.

(10) Patent No.: US 7,995,211 B2
(45) Date of Patent: Aug. 9, 2011

(54) CONTRA-PROPAGATIVE WAVE SPECTOGRAPH

(75) Inventors: Etienne Le Coarer, Grenoble (FR); Pierre Benech, Grenoble (FR); Pierre Kern, Corenc (FR); Gilles Lerondel, Saint-Julien-les-Villas (FR); Sylvain Blaize, Troyes (FR); Alain Morand, Grenoble (FR)

(73) Assignee: Universite Joseph Fourier (FR)

( * ) Notice: Subject to any disclaimer, the term of this patent is extended or adjusted under 35 U.S.C. 154(b) by 404 days.

(21) Appl. No.: 12/063,214

(22) PCT Filed: Aug. 4, 2006

(86) PCT No.: PCT/FR2006/001908
§ 371 (c)(1),
(2), (4) Date: May 1, 2009

(87) PCT Pub. No.: WO2007/017588
PCT Pub. Date: Feb. 15, 2007

(65) Prior Publication Data
US 2009/0219543 A1 Sep. 3, 2009

(30) Foreign Application Priority Data
Aug. 8, 2005 (FR) ...................................... 05 08429

(51) Int. Cl.
*G01B 9/02* (2006.01)
*G01J 3/45* (2006.01)
(52) U.S. Cl. ........................................ 356/483; 356/451
(58) Field of Classification Search .................. 356/451, 356/477, 483
See application file for complete search history.

(56) References Cited

U.S. PATENT DOCUMENTS

| | | | | |
|---|---|---|---|---|
| 4,728,192 A * | 3/1988 | Shaw et al. | ................... | 356/464 |
| 4,773,759 A * | 9/1988 | Bergh et al. | ................... | 356/460 |
| 4,890,922 A * | 1/1990 | Wilson | ......................... | 356/464 |
| 4,915,503 A * | 4/1990 | Pavlath | ........................ | 356/460 |
| 4,938,594 A * | 7/1990 | Pavlath | ........................ | 356/460 |
| 5,074,665 A * | 12/1991 | Huang et al. | ................... | 356/465 |
| 5,111,466 A | 5/1992 | Normandin et al. | | |
| 7,835,417 B2 * | 11/2010 | Heideman et al. | .............. | 372/94 |
| 2006/0024013 A1 * | 2/2006 | Magnusson et al. | .......... | 385/129 |

OTHER PUBLICATIONS

Froggat M et al, "All-Fiber Wavemeter and Fourier-Transform Spectrometer", Optics Letters, OSA, Optical Society of America, Washington DC, vol. 24, No. 14, Jul. 15, 1999, pp. 942-944.
Normandin R et al, "Monolithic Surface-Emitting, Semiconductor Visible Lasers and Spectrometers from WDM Fiber Communication Systems", IEEE Journal of Quantum Electronics, IEEE Service Center, Piscataway, NJ, vol. 27, No. 6, Jun. 1, 1991, pp. 1520-1530.
Labeyrie A et al., "Optical data storage in microfibres", Optics Letters, OSA, Optical Society of America, Washington DC, vol. 23, No. 4, Feb. 15, 1998, pp. 301-303.

* cited by examiner

*Primary Examiner* — Patrick J Connolly
(74) *Attorney, Agent, or Firm* — Rader, Fishman & Grauer PLLC (57) ABSTRACT

The invention relates to a spectrograph (11) comprising a waveguide (10) provided with accesses (10; 10*b*, 12), a means for injecting two guided contra-propagative waves by each accesses in such a way that a spatial interference is formed in the waveguide, means (19, 20, 14, 16) for detecting the energy of the evanescent wave of the guided field produced by the interference of said contra-propagative waves.

8 Claims, 9 Drawing Sheets

CONTRA-PROPAGATIVE WAVE SPECTOGRAPH

The present invention relates to the field of optics.

The present invention relates more specifically to a Fourier transform spectrograph with guided lens using contra-propagative waves.

It is known that contra-propagative waves in a waveguide form interference as shown in the publication by Labeyrie et al. (Labeyrie, A. and Huignard, J. P. and Loiseaux, B., Optical data storage in microfibers, Optics Letters, 23, 301-303 (1998)). The interferogram obtained depends on the difference in the optical path taken by each of the waves, and this interferogram can be analysed to obtain information on the light sources and/or on the environments these waves pass through.

However, when contra-propagative waves interfere in a waveguide, the interferogram obtained remains confined in the guide and cannot be accessed for spectrometric measurements.

The prior art also knows a contra-propagative wave spectrograph described in the publication by Froggat and Erdogan (Froggat, M. and Erdogan, T., All-fiber wavemeter and Fourier-transform spectrometer, Optics Letters, 24, 942-944 (1999)). An interferogram is obtained by forming interference between two contra-propagative waves extracted from the guide by a Bragg grating present inside the guide. The light is extracted from the guide at an angle which depends on the ratio between the wavelength $2\lambda$ and the pitch of the Bragg grating $\Lambda$: $\sin(\alpha) = n_{eff} - \lambda/\Lambda$ (p 943, coll, 116-24).

In this system, it is absolutely necessary to use a periodic grating inside the guide. The pitch of the interferogram as recorded on the detector depends on this angle and on the pitch of the Bragg grating. For example, for a monochromatic wave, Froggat obtained the following fringe period: $P_{Froggat} = \frac{1}{2}(n_{eff} - \lambda/\Lambda)$. However, the interferogram obtained in Labeyrie's aforementioned publication depends only on the path difference of the waves from their point of division. For example, in the case of a monochromatic wave, $P_{Labeyrie} = \frac{1}{2} n_{eff}$.

In this system, a propagative wave associated with the injected signal is created. This propagative wave is distinct from the interference field and does not provide direct access to the interferogram located in the guide.

Furthermore, the system and, in particular, the periodic Bragg structure, continues to disrupt the wave inside the guide.

Furthermore, the above system only specifies the injection of a single wave, which is reflected by a contra-propagative wave. This has the disadvantage of not allowing access to a central fringe of potential interferences.

The invention aims mainly to solve these disadvantages.

The present invention therefore aims to provide access to this interferogram for guided contra-propagative waves.

Accessing the interferogram by the interference of contra-propagative waves has the additional advantage of not requiring any moving parts for observation, unlike a conventional Michelson interferometer, for example.

For this reason, the present invention relates to a spectrograph 11 comprising a waveguide 10 provided with two accesses, means for injecting two guided contra-propagative waves by each one of said accesses in such a way that a spatial interference is formed in said waveguide, and means for detecting the energy of the evanescent wave of the guided field produced by the interference of said contra-propagative waves.

According to the invention, the interferogram located in the waveguide is accessed by means of the evanescent wave of the guided field, which provides real access to this interferogram.

On the other hand, in Froggat's aforementioned publication, a periodic grating located within the guide extracts each of the two waves and causes them to interfere on the detector constituting a different interferogram.

Said detection means preferably comprise at least one flat waveguide (14, 14a, 14b) located near said guide and at least one photodetector arranged such as to detect a wave coming from said flat waveguide.

Advantageously, said detection means comprise a plurality of local detectors distributed between the two accesses of said guide.

Advantageously, said detection means comprise at least one fixed or mobile diffusing point and at least one photodetector.

According to one embodiment, said means of injecting the two waves is a wave separator arranged such as to direct the two parts of the same wave according to the two accesses to said guide.

The invention also relates to a spectroscopic imaging system, comprising a plurality of spectrographs according to the invention, arranged in an array, the injection means being in the focal plane of an input lens.

The invention will be understood better from the following description, provided merely for the purpose of explanation, of one embodiment of the invention, in reference to the appended drawings.

Figure 1:
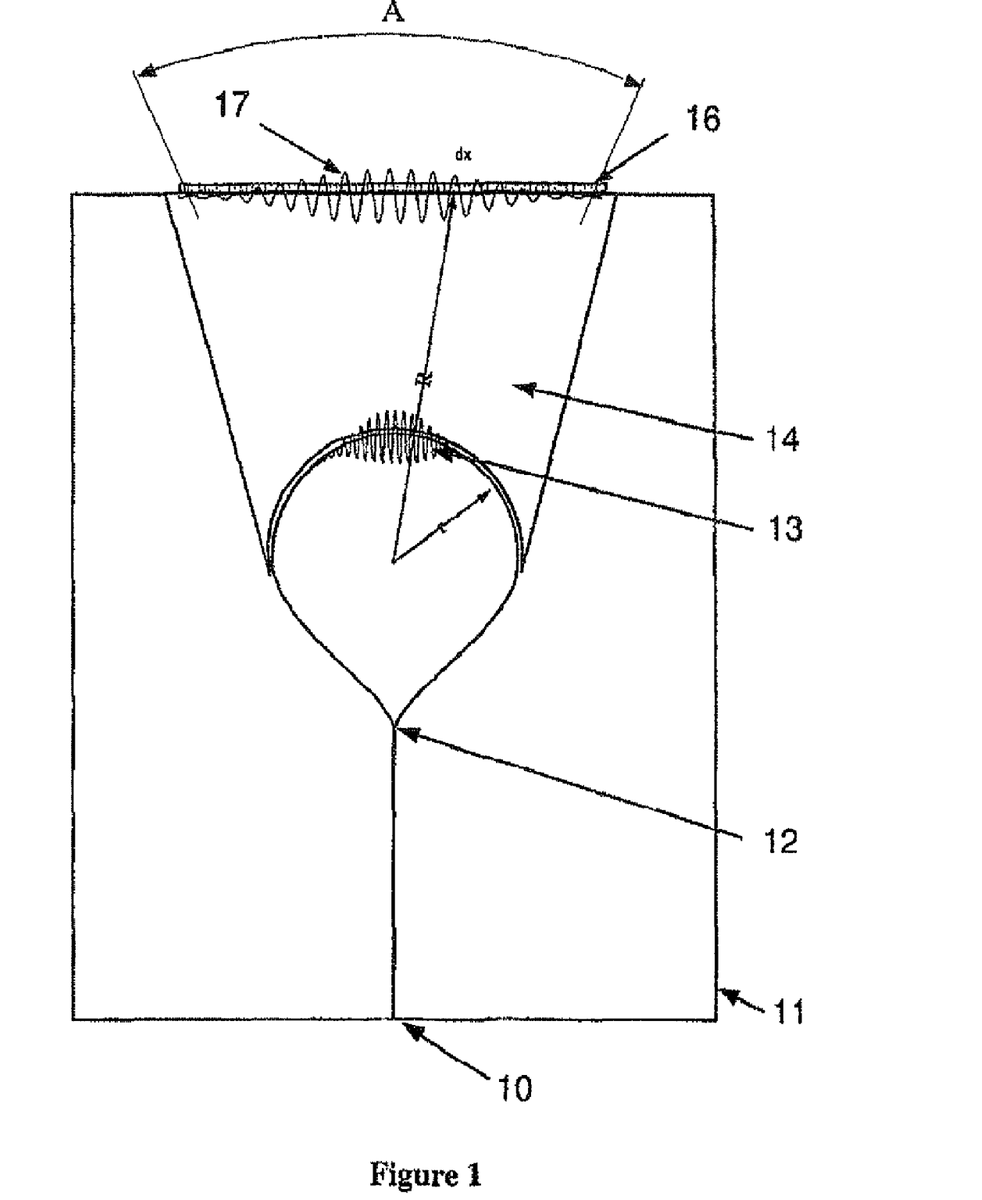
FIG. 1 shows a first embodiment of the invention comprising a closed-loop contra-propagative spectrograph.

According to a first embodiment of the invention shown in FIG. 1, the light to be analysed is introduced in the device 11 at the end of the waveguide 10 either by connectorising optical fibre or by injection using a volume optical device or any other system for injecting light, guided or otherwise.

The light propagates towards the component 12 which separates the wave into two parts. The interferogram is formed around the zone 13 which ensures evanescent wave decoupling of the light from the curved waveguide. The component 12 guarantees that the waves pass through two distinct access means of the guide 10 at the zone 13. The oscillating function shown in FIG. 1 at zone 13 shows the interferogram present in the interference zone 13.

The zone 13 is positioned at the same distance from the zone 12 that separates the wave following the two paths that connect them.

The device 11 also comprises a flat waveguide zone 14 such that the light present in the curved waveguide can exit the zone 14 in a radial manner so that the part of the interferogram that was present in the curved waveguide is guided in the vertical direction perpendicular to the plane of the figure (which is to say in the thickness of the component) towards the edge of the medium 17 while being geometrically enlarged in the plane of the system by the ratio R(x)/r, where x is the coordinate along the edge, r is the radius of curvature of the guide and R(x) is the radial distance separating the point on the x coordinate at the centre of the curvature from the corresponding part of the guide.

In this embodiment, the fringe pitch can be adjusted according to the distance ratio R/r from the apex to the centre of curvature of the loop, which allows correct Shannon sampling of the interferogram using a detector in which the dimension of the pixels is larger than one quarter of the wavelength, unlike the spectrograph in Froggat's aforementioned publication, in which the period of the fringes depends only on the grating pitch chosen, which then only provides access to a narrow spectral range $\lambda^2/(4neff \cdot p)$ around $\Lambda/2$.

The zone 14 corresponds, for example, to a flat waveguide juxtaposed on the curved waveguide used to control the escape rate of the light coming from the curved waveguide and to guide the light to the apex of the component 17. It is understood that, for a non-curved waveguide, the prism 14 can also be used to delocalise the detection.

Inside the prism 14, the evanescent wave of the guided field formed by the interference of the contra-propagative waves is converted into a propagative wave which makes it possible to delocalise the detection.

Photosensitive detection means 16 are adjusted along the tangential area of the medium so as to detect the part of the interferogram extracted from the guide.

The reconstruction of the signal must take into consideration the geometrical transformation which projects the curved abscissa along the guide towards the x coordinate. This geometry means that for a detector having evenly spaced pixels, the sampling law of the interferogram is such that $\delta = \arctan(x/R) \cdot r$; $\delta$ being the curved abscissa of the path differences taken from the central fringe point for equal optical paths from the separation zone 12. x represents the geometrical distance for projection of the interferogram on the apex of the component.

The amount of light extracted from the guide in the decoupling zone 13 of the guide 10 depends on a geometrical adaptation or the refractive index between the curved waveguide and the flat waveguide. It is thus possible to modulate the amount of light that must escape from each point of 13, which thus makes it possible to act regarding the apodisation of the interferogram sampled at the edge of the medium 17. Thus, a constant adaptation of the escape rate leads to an exponentially decreasing distribution of light along the curved waveguide in zone 13, which depends on the direction in which the wave enters this part. The dimensions of the system depend on the gap between the detector image elements (pixel). The dimensioning is calculated, for example, as follows:

The characteristics of the detector 16, dx the dimension of the pixel and N the number of pixels in the strip are used as a starting point. The length of the detector 16 is then $L = N \cdot dx$. In the range of frequencies to be analysed, the is detector must be sensitive and the waveguides must be monomode and propagative. Then, the range of operational wavelengths is defined by $\lambda_{min}$ and $\lambda_{max}$.

The sampling at the centre of the interferogram must make it possible to place two pixels for a distance that corresponds to the fringe spacing at the wavelength $\lambda_{min}/4$ in the environment of index n multiplied by the enlargement G caused by the flat waveguide 14 according to the Shannon theorem in a broad band. This enlargement at the centre of the interferogram is $G = R/r$ so that:

$$dx = G \cdot \lambda_{min}/4n.$$

The beam angle A of the prism 14 must match the length of the detector plotted to the centre of curvature of the loop of the contra-propagative guide.

$$A = 2 \arctan(L/2R).$$

Finally, the curvature r of the guide and the exact shape of the flat waveguide 14 are dictated by an electromagnetic calculation known, for example, from the publication by R. Hiremath et al. (K. R. Hiremath, M. Hammer, R. Stoffer, Prkna, J. Ctyroky, Analytical approach to dielectric optical bent slab waveguides Optical and Quantum Electronics 37 (1-3), 37-61 (2005)) depending on the desired escape rate.

Figure 2:
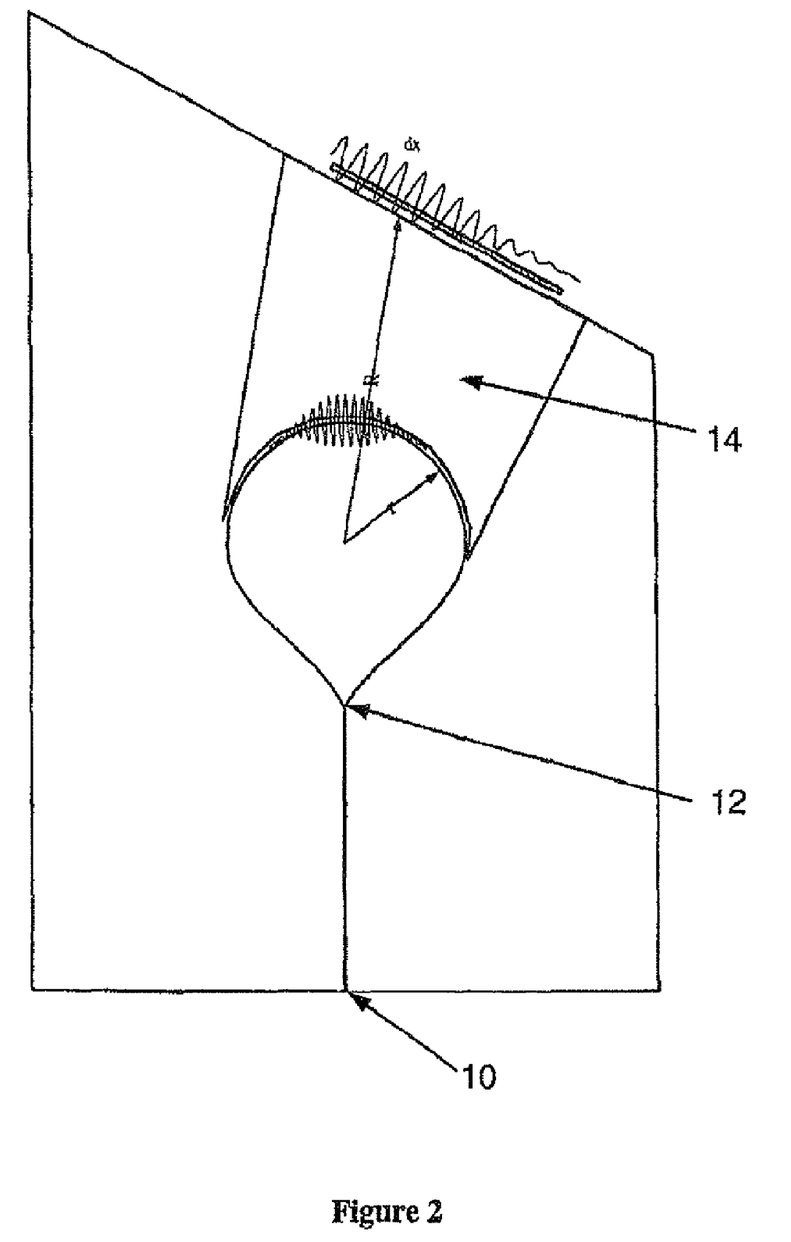
FIG. 2 shows a second embodiment of the invention with detection on an inclined plane.

According to a second embodiment of the invention, shown in FIG. 2, the guiding zone 14 has an asymmetric shape so that it can record an interferogram in an asymmetric manner in relation to the central fringe. Furthermore, by cutting the plane 17 obliquely in relation to the symmetry of the system, the fringes corresponding to the centre of the interferogram, which are richer in information on the spectrum will be better sampled to the detriment of the sampling of the high-frequencies, which are sometimes of less interest.

In a similar manner, it is also possible to extend one of the arms of the interferometer in a configuration such as shown in FIG. 1. In this way, the interferogram will be offset on the strip of the photodetector in the direction in which the loop of the guide 10 was extended.

Figure 3:
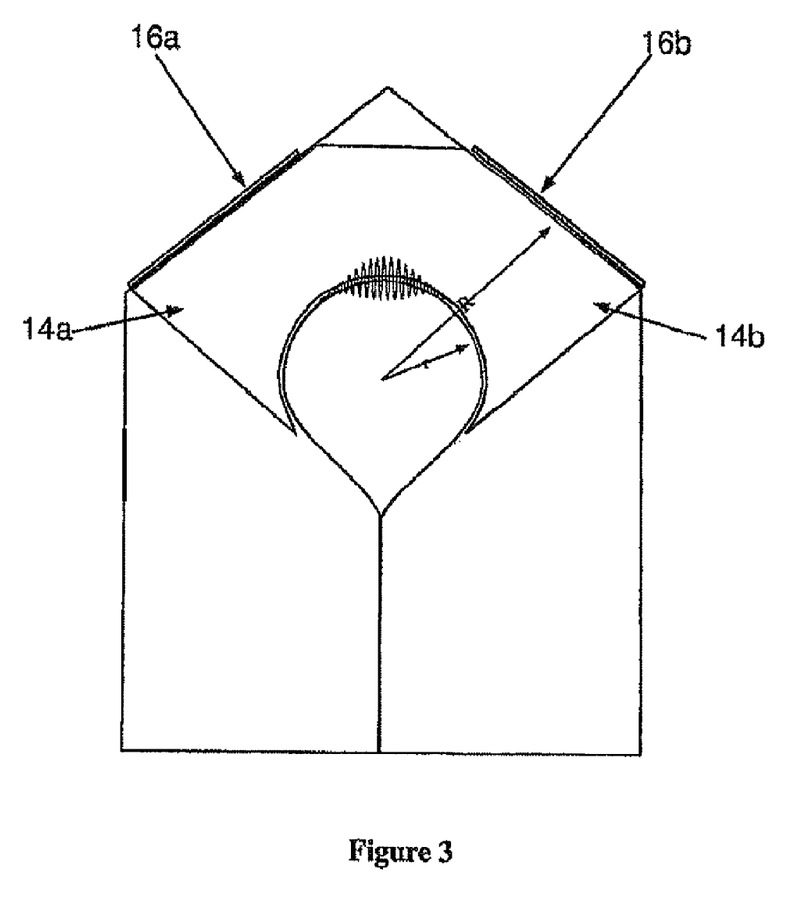
FIG. 3 shows one embodiment of the invention with two prisms.

As shown in FIG. 3, the spectrograph according to the invention can also comprise a plurality of prisms 14a, 14b, associated with a plurality of detectors 16a, 16b, such as to sample several distinct parts of the interferogram.

Figure 4:
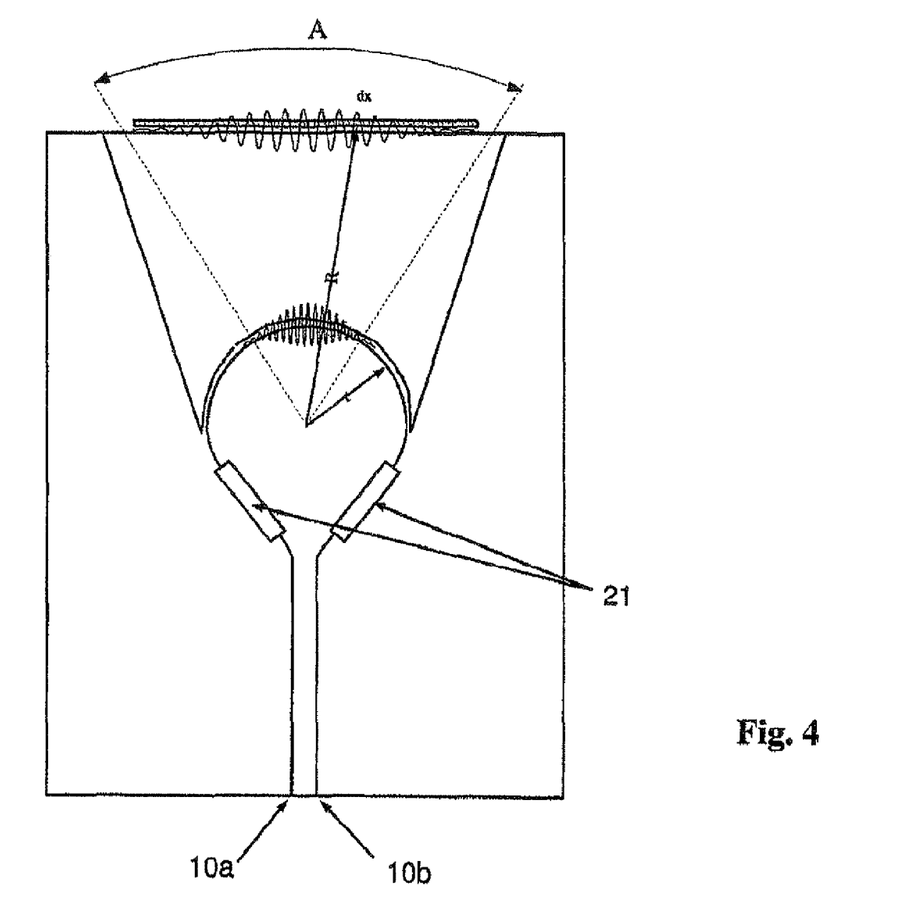
FIG. 4 shows one embodiment of the invention for a guide with two inputs.

According to another embodiment shown in FIG. 4, it is possible to divide the wave prior to injecting it into the two accesses of the guide 10a and 10b. This configuration is particularly optimised for measuring the phase of the interferogram. The symmetry of the system guarantees perfect achromaticity, and thus insensitivity of the phase measurement to wavelength fluctuations in the signal to be measured. In addition, it is possible to modify the optical path on one of the channels in the actual component 21, either by means of an electro-optical effect that modifies the index of the environment, as in the case of lithium niobate, or by an elastic-optical or acoustic-optical effect and any other methods. Externally, this optical path shift can form a system for separating the wave and the hold-up line such as a Michelson assembly, for example. This variation makes it possible to record other parts of the interferogram and thus to increase the spectral resolution of the system or improve the sampling of the interferogram.

Figure 5:
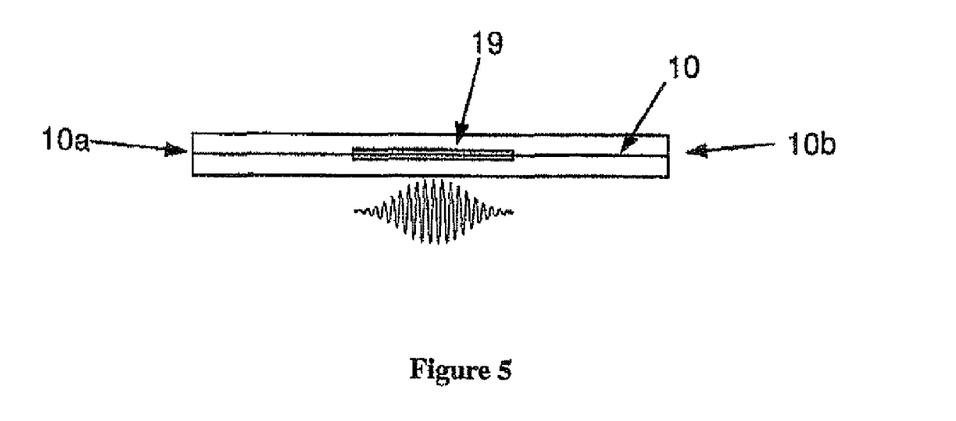
FIG. 5 shows one embodiment of the invention wherein the detection is carried out by a plurality of local detectors in the evanescent field.

According to another embodiment of the invention, shown in FIG. 5, the previously divided wave is injected into the component by 10a and 10b through the two accesses of a waveguide 10, the wave interferes in the guide and detectors, diffusing points or bolometers 19 are placed on the surface of the guide and are therefore sensitive to a fraction of the field present inside the guide.

In this way, for example, a plurality of fixed local detectors 19 are positioned on the outside of the guide 10. A material that is sensitive to the evanescent waves produced by the guide 10 can be used, for example, to make these local detectors. The detectors 19 then sample the intensity of the evanescent waves.

Those skilled in the art will clearly understand that, in the event of needing to detect a wavelength λ, the detectors are spaced by a distance substantially equal to λ/4, in order to reconstruct the corresponding signal.

For broadband detection of a polychromatic spectrum, this distance must be one quarter of the shortest wavelength of the studied spectrum. Shorter wavelengths will then be detected with reduced efficiency or even not at all contributing to the interference systems.

Conversely, for narrowband detection of a polychromatic spectrum it is possible to place detectors at a distance of more than λ/4 according to the Shannon theorem in narrowband if these detectors have a size smaller than one quarter of the shortest wavelength of the studied spectrum.

The detection layer 19 therefore includes, for example, a plurality of equidistant local detectors, bearing in mind that regular distribution can lead to a disruption in the wave by a Bragg grating effect.

In order to solve this problem, it is possible potentially to place a continuous photosensitive environment between the waveguide and the evenly spaced local detectors, or else to position the local detectors in a non-periodic manner such as, for example, a spacing series that will be defined by the succession of prime numbers.

It shall be noted that these detectors can be of several types with no limitation on the scope of the invention.

These are, for example, photoconductive junctions pn made on a thin semi-conductor substrate comprising photodiodes and electrodes for collecting a current at the terminals of the photodiodes. This substrate is adjacent to the waveguide 10, either by molecular adhesion or by gluing.

The detectors can also be microbolometers with superconductor wires forming a distributed network between the two opposing accesses of the waveguide 10.

It is also possible to use microantennas, selenium photoconductors or Johnson-effect photodetectors.

Figure 6:
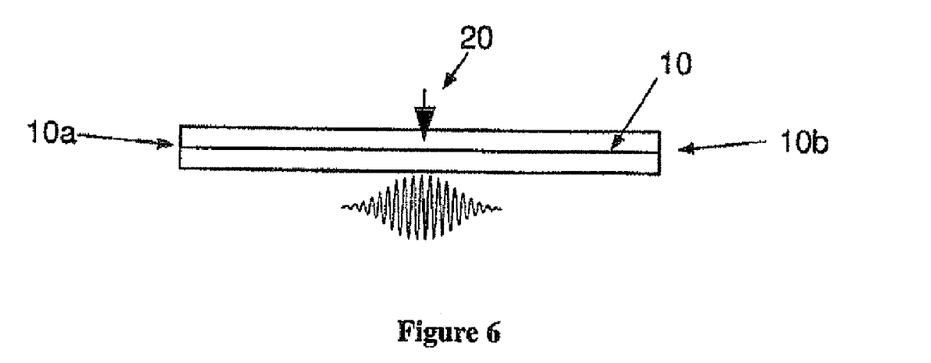
FIG. 6 shows one embodiment of the invention wherein the detection is carried out by a diffusing point.

In a similar manner, shown in FIG. 6, the interferogram generated inside the guide 10 is highly sensitive to the phase shift between the two waves at the opposite inputs 10a and 10b of the structure: the interferogram moves along the guide according to this phase shift. It is therefore possible to record the interferogram throughout its movement by means of a detector or a single fixed or mobile diffusing point 20 placed on the guide.

It is also possible to replace the photodetectors in the evanescent field with one or more diffusing points with a diameter smaller than one quarter of the shortest wavelength in the direction of propagation in order to convert the evanescent field and to cause it to propagate towards a detector placed outside the evanescent zone, allowing the use of detectors that are thicker than the wavelength, such as the pixels of a CCD, for example.

Either a known phase shift is imposed, making it possible to record the interferogram (spectrometric measurements), or the movement of the interferogram is measured, making it possible to determine the phase shift between the two waves (metrology) or, finally, the diffusing point is moved in a known manner to record the interferogram.

Figure 7:
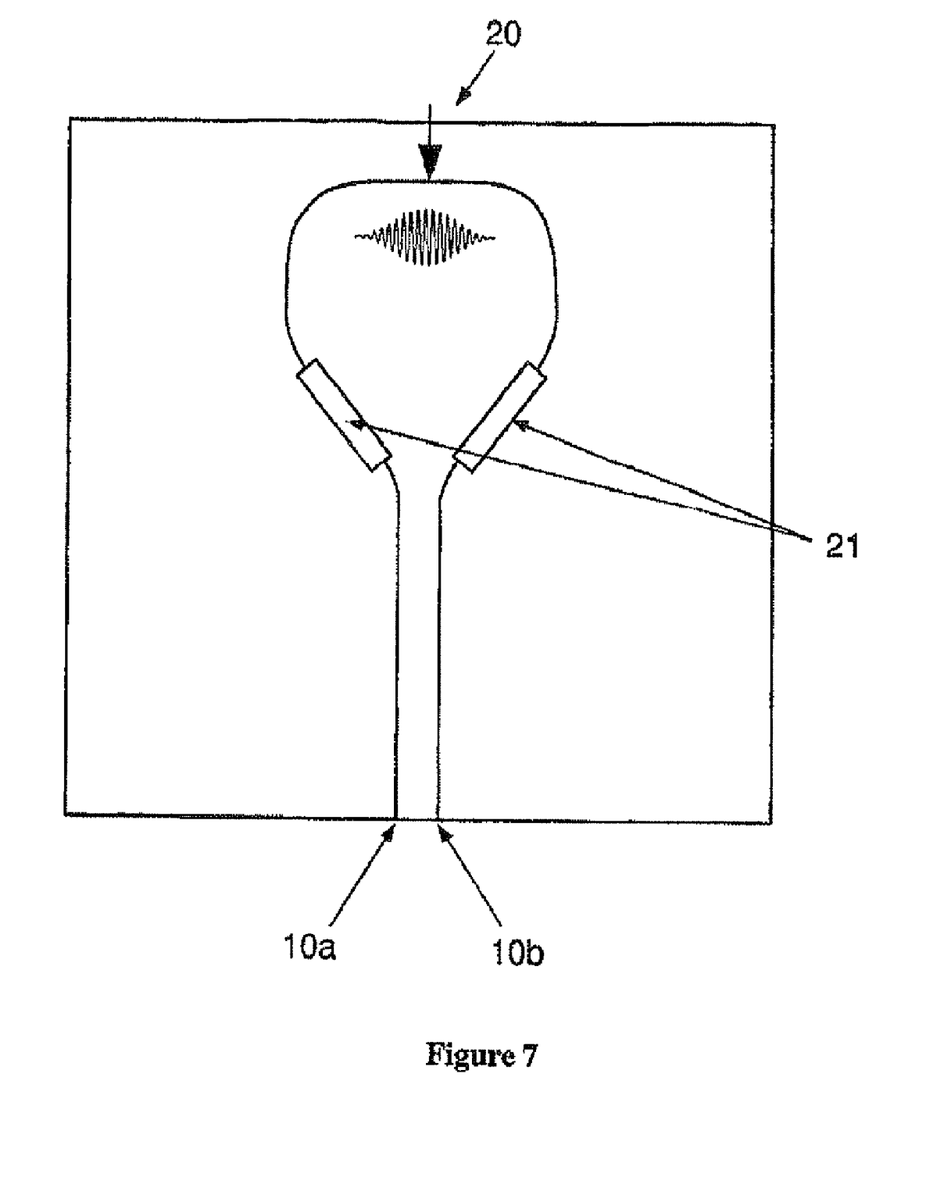
FIG. 7 shows one embodiment of the invention comprising signal phase shift means.

One way of shifting the phase inside the component is shown in FIG. 7, in the case open by action on the optical path 21, the wave separation is external and injected in 10a and 10b. The interferogram is detected by the diffusing point or defect 20.

Figure 8:
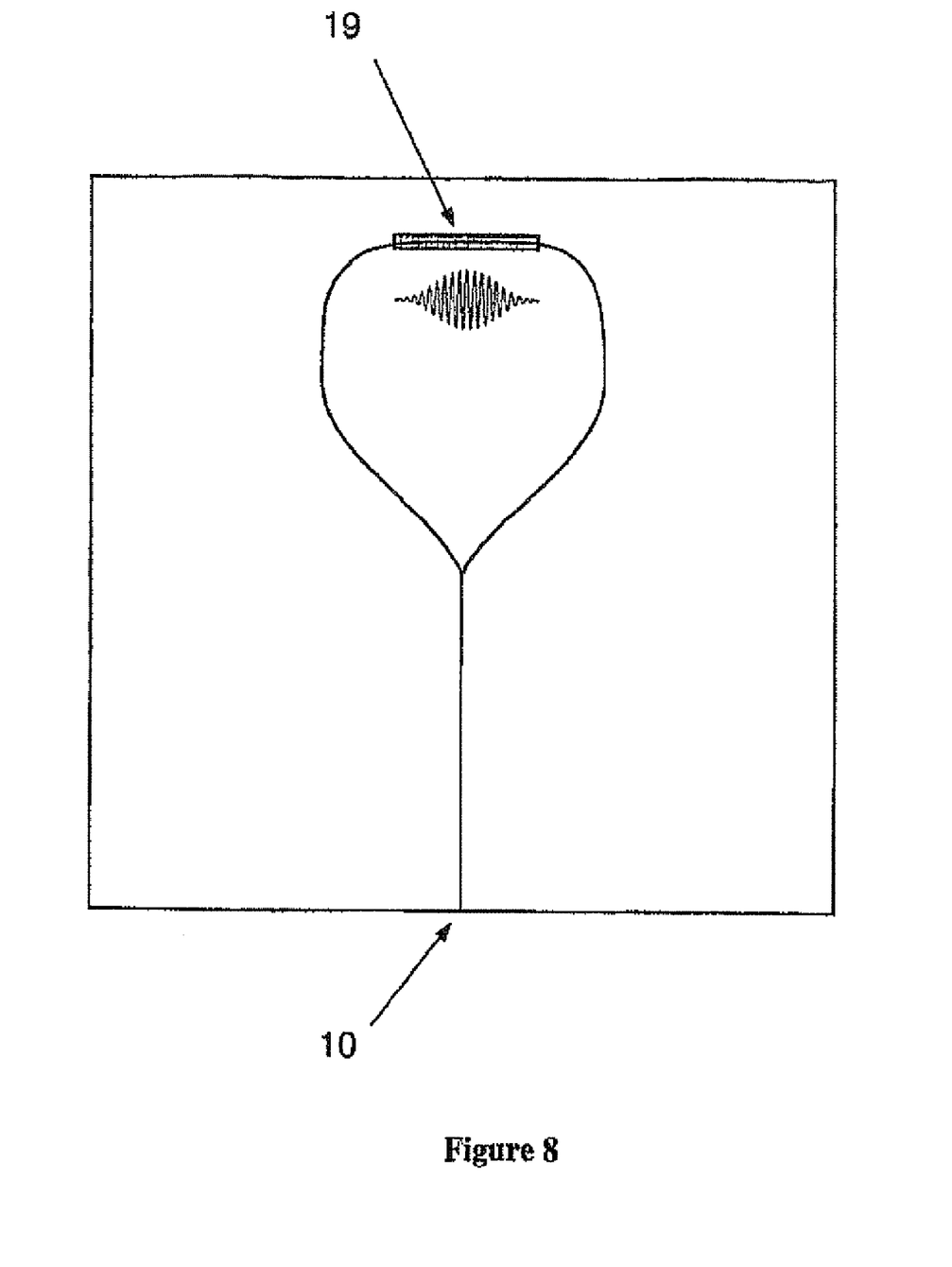
FIG. 8 shows one embodiment of the invention wherein a loop waveguide and a plurality of local detectors are used.

As shown in FIG. 8, it is possible to use a closed guide with wave separation equipped with the local detectors described in relation to FIG. 5. In this case, although the guide is not curved, it is also possible to position a prism as in FIG. 1 to observe the interference figure on the edge of the device without enlargement.

Figure 9:
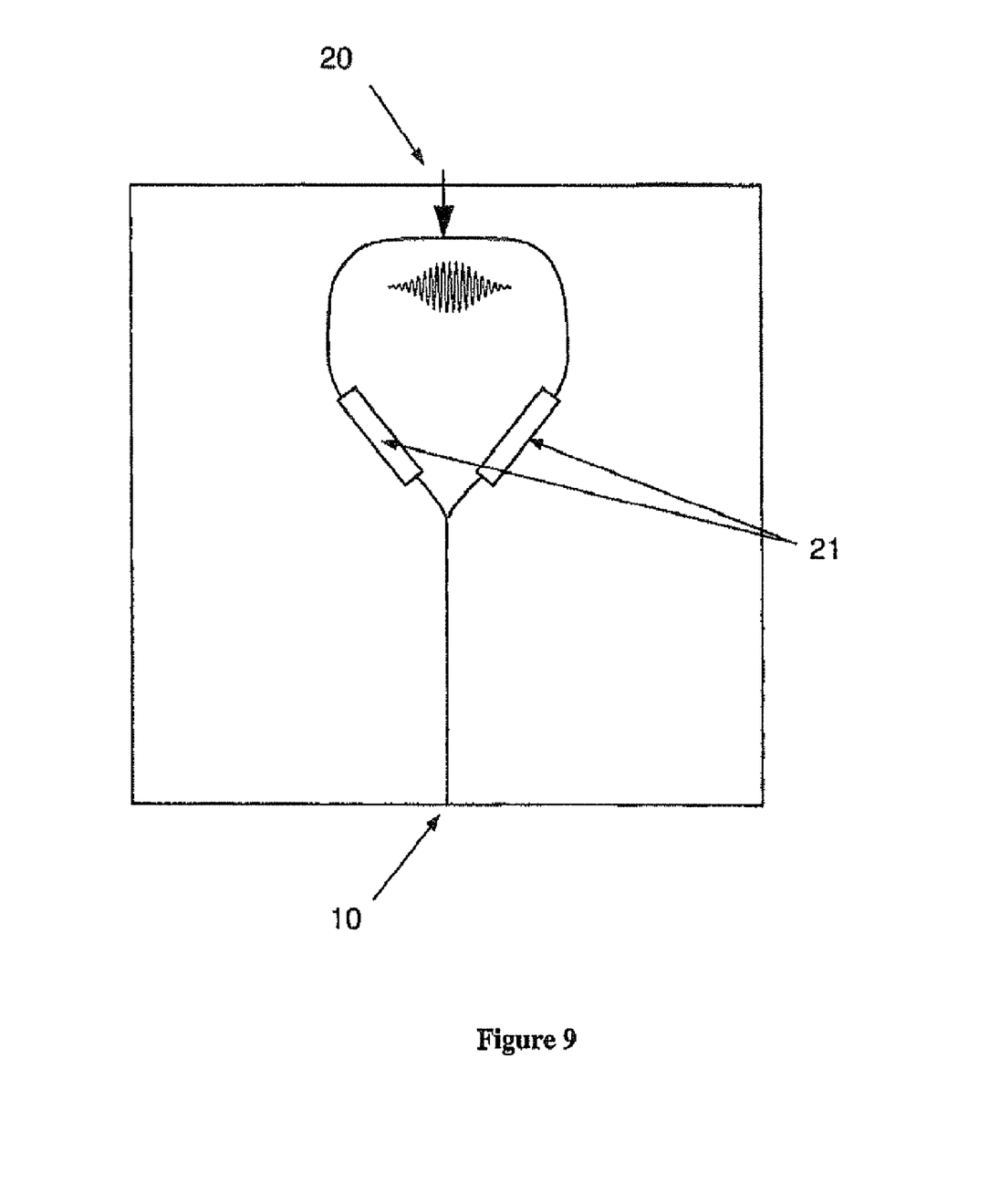
FIG. 9 shows another embodiment of the invention for a closed loop and phase shift means.

In the same manner, it is possible to use a diffusing element in combination with an internal division of the wave as shown in FIG. 9.

Finally, the invention also relates to a spectrometric imaging system comprising a plurality of spectrographs such as previously described, arranged in an array. In this case, the obtained system is made up of two lenses allowing the wave to be adapted to a monomode guide. A detector collection is placed in the evanescent field of the guide. For example, a CCD detector strip is obtained, which must have a pitch smaller than one quarter of the wavelength considering the index of the environment in which the monomode guide is manufactured. A mosaic made up of such elements must be used in an optical system which divides the wavefront and forms the image simultaneously on the two faces of this mosaic.

The invention providing a spectrograph with on-site detection is applicable in numerous fields using spectrographic measurements, such as gyrolasers, metrology or OCT (Optical Coherence Tomography) or even sensorics (chemical and biochemical detection and analysis).

The invention claimed is:

1. Spectrograph including
   a waveguide (10) provided with two accesses (10a, 10b, 12),
   means for injecting two guided contra-propagative waves by each of said accesses in such a way that a spatial interference is formed in said waveguide,
   means for detecting (19, 20, 14, 16) the evanescent wave of the guided field produced by the interference of said contra-propagative waves.

2. Spectrograph according to claim 1, characterised in that said detection means comprise at least one flat waveguide (14, 14a, 14b) located near said guide and at least one photodetector arranged such as to detect a wave coming from said flat waveguide.

3. Spectrograph according to claim 1, characterised in that said detection means comprise a plurality of local detectors distributed between the two accesses of said guide.

4. Spectrograph according to claim 3, wherein said local detectors have a size smaller than one quarter of the wavelength of said waves.

5. Spectrograph according to claim 1, characterised in that said detection means comprise at least one fixed or mobile diffusing point and at least one photodetector.

6. Spectrograph according to claim 5, wherein said diffusing point has a size smaller than one quarter of the wavelength of said waves.

7. Spectrograph according to claim 1, characterised in that said means of injecting the two waves is a wave separator arranged such as to direct the two parts of the same wave according to the two accesses to said guide.

8. Spectroscopic imaging system, characterised in that it comprises a plurality of spectrographs according to any one of the preceding claims, arranged in an a array, the injection means being in the focal plane of an input lens.

* * * * *